(12) United States Patent
Halbraich

(10) Patent No.: US 7,545,803 B2
(45) Date of Patent: Jun. 9, 2009

(54) THIRD PARTY RECORDING OF DATA TRANSFERRED USING THE IP PROTOCOL

(75) Inventor: Eran Halbraich, Beit-Zayit (IL)

(73) Assignee: Nice Systems Ltd., Raanana (IL)

( * ) Notice: Subject to any disclaimer, the term of this patent is extended or adjusted under 35 U.S.C. 154(b) by 171 days.

(21) Appl. No.: 11/344,478

(22) Filed: Feb. 1, 2006

(65) Prior Publication Data
US 2006/0227719 A1 Oct. 12, 2006

Related U.S. Application Data

(60) Provisional application No. 60/661,908, filed on Mar. 16, 2005.

(51) Int. Cl.
*H04L 12/66* (2006.01)
(52) U.S. Cl. ...................................... 370/356
(58) Field of Classification Search ................. 370/252, 370/352, 356; 379/22, 112.08
See application file for complete search history.

(56) References Cited

U.S. PATENT DOCUMENTS

| | | | | |
|---|---|---|---|---|
| 6,295,293 B1* | 9/2001 | Tonnby et al. | ............... | 370/389 |
| 6,553,025 B1* | 4/2003 | Kung et al. | ................... | 370/352 |
| 6,937,706 B2* | 8/2005 | Bscheider et al. | ......... | 379/88.22 |
| 7,006,448 B1* | 2/2006 | Thio | ........................... | 370/252 |
| 2003/0147381 A1* | 8/2003 | Nelson et al. | ............... | 370/352 |
| 2004/0019700 A1* | 1/2004 | Ilan et al. | ..................... | 709/249 |
| 2004/0161086 A1* | 8/2004 | Buntin et al. | ............... | 379/189 |

\* cited by examiner

*Primary Examiner*—Thai D Hoang
(74) *Attorney, Agent, or Firm*—Pearl Cohen Zedek Latzer, LLP

(57) ABSTRACT

A method or apparatus for managing monitoring of packet data traffic of a packet switched telephony trunk connection, such as an IP trunk, wherein the data packets identify ports but monitoring is based on extension lines and the like. A mapping unit is used for obtaining mapping data that relates ports to respective individual connections or extension lines. A packet duplication unit copies data traffic from the trunk, and an associative access unit either stores or allows direct use of the data via the mapping information.

25 Claims, 7 Drawing Sheets

Fig. 1 – Prior art

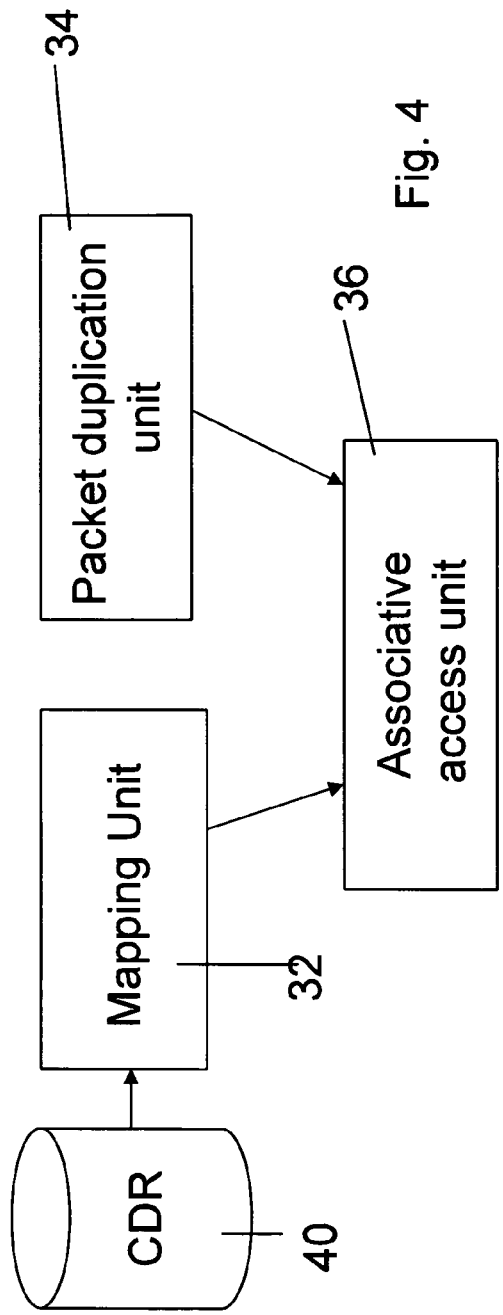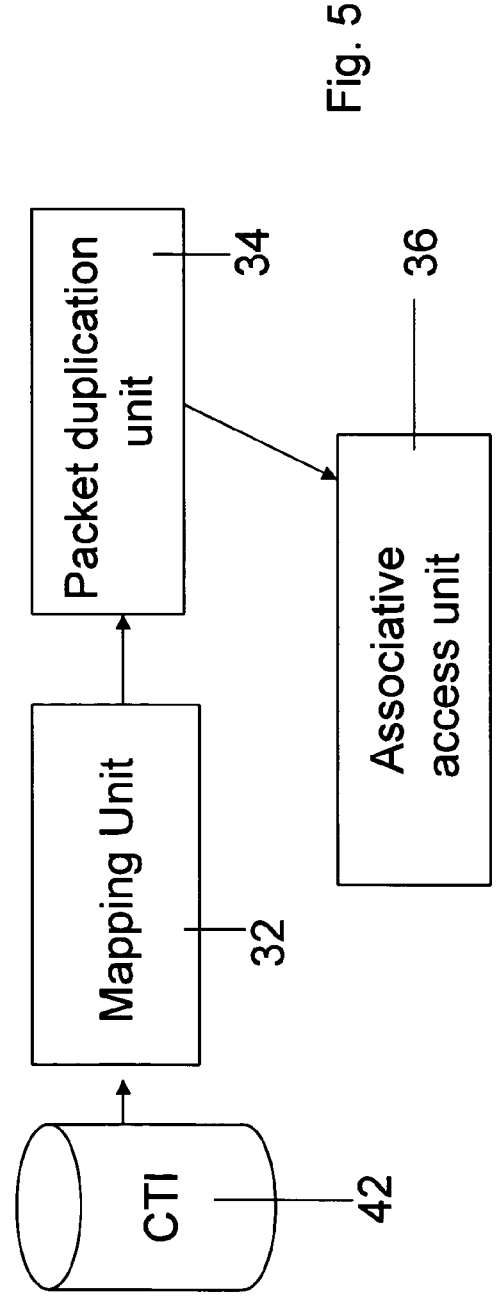

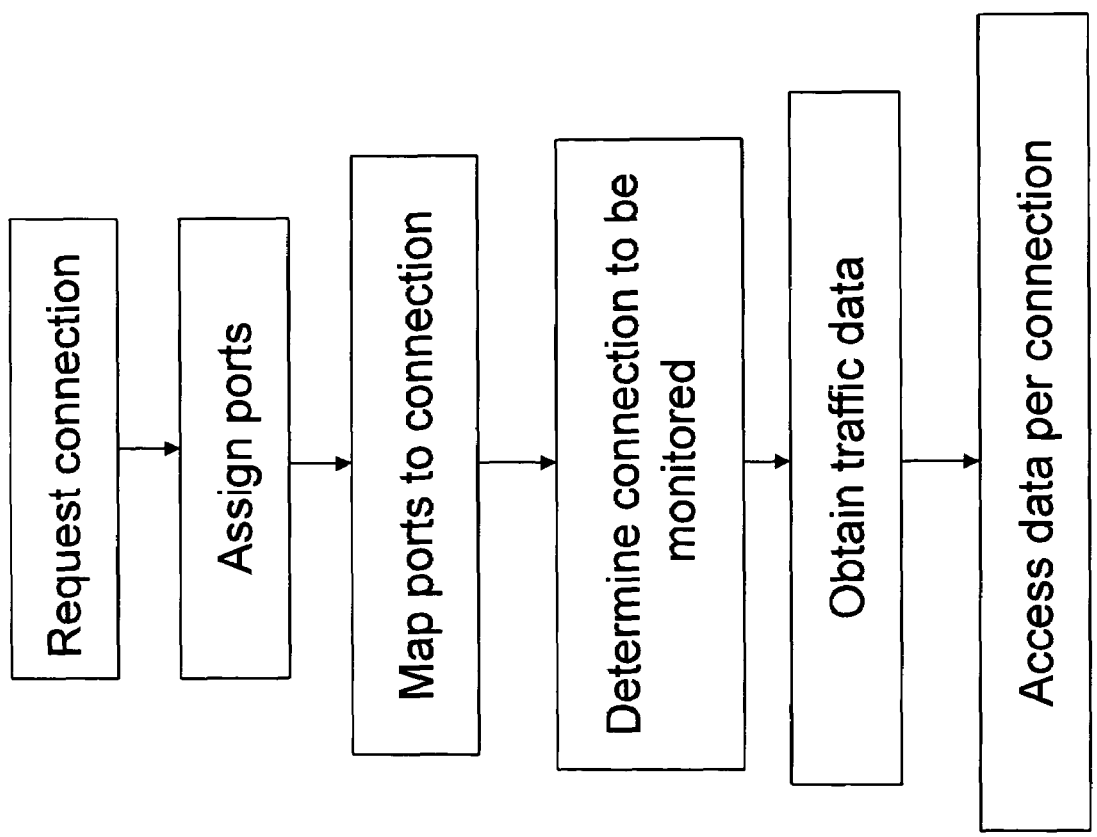

THIRD PARTY RECORDING OF DATA TRANSFERRED USING THE IP PROTOCOL

RELATED APPLICATIONS

This present application claims priority from U.S. Provisional Patent Application No. 60/661,908, filed on Mar. 16, 2005, the contents of which is incorporated herein by reference.

FIELD AND BACKGROUND OF THE INVENTION

The present invention relates to the recording of data as a third party to a data transfer wherein the data is transferred using the IP protocol and, more particularly, but not exclusively to such recording wherein numerous such transfers are carried out within the framework of an IP-based trunk connection.

Data transfers of all kinds are carried out over telephone networks, from straightforward speech data to complex and high speed transfers of data that may be compressed or encrypted.

Organizations often wish to monitor the data that is being transferred in and out of their networks, for numerous reasons. A financial securities company that receives buy and sell instructions over the telephone may wish to monitor orders in case of dispute. A customer service unit may want to monitor the performance of its telephone operators. An organization carrying confidential information may wish to be made aware when apparently confidential information is being routed outside the organization.

In the earliest telephone call monitoring systems, the calls are not actually recorded. Instead, data are typically collected on each incoming call to the system. This data consists of a log of events occurring in the system over time for an incoming call. Typical logged data elements are receipt of call, call offered to an application, call presented to an agent or an agent group, call handled or abandoned and length of call. The data representing these data elements are then processed to generate reports for use by management or supervisory personnel. The data may be organized in any number of ways, such as by agent, telephone trunk, agent groups and the like. Based on this information, management and supervisory personnel are able to evaluate an agent's telephone call activity and take corrective action where an agent's performance falls below acceptable norms.

Unfortunately, such prior art telephone call monitoring systems firstly do not actually record the calls, and secondly, are limited in their ability to discriminate between different telephone calls and agents based on criteria other than simple scheduling imperatives. At the end of the day, they rely almost entirely on human intervention to evaluate the quality of service provided by an agent.

There were thus developed prior art telephone call monitoring systems that provide for telephone call recording. However these systems typically record either all telephone calls received by an agent or record telephone calls according to a schedule.

In order to record traffic of telephone exchanges in a more efficient manner, monitoring systems were developed that use the properties of time division multiple access (TDMA), a system often used on trunk routes. Typically, an office or like organization uses a private automatic branch exchange (PABX) to connect its own numerous extension lines to each other and to the outside world. The connection to the outside world is typically a trunk connection that uses some form of multiplexing of individual connections, typically TDMA. The PABX may additionally have dedicated trunk routes or tie lines to other PABX's of the same or related organizations.

The monitoring systems make use of the time slots in TDMA. TDMA makes use of multiplexing arrangements such as T1 or E1 which define the number of slots available on the trunk. Thus E1 may define 30 time slots for example. In what is known as static allocation, a given time slot in TDMA may represent a given extension line. Thus extension 304 may always use time slot 16. The monitoring system knows this and is able to look for extension 304 as required.

In an alternative system, known as dynamic allocation, a particular extension is allocated the next available time slot as required. In this case there is provided an allocation matrix which allows the monitoring system to look up the extension required and find the necessary time slot.

TDMA was generally considered the most cost effective way of trunking prior to use of the Internet protocol. As described above, it is possible to tap into the time slots. Then from the time slots themselves it is possible to receive all the data of the call. It is also possible to record an entire trunk or a selection from a group of trunks, and in all cases it is possible to search the recording and find the connection or conversation of interest, because the association between connection and time slot is always available.

Recording of an individual connection entails identifying the time slot, obtaining the signal and demodulating. The demodulated signal can then be recorded.

As a further development, matrices for mapping conversations and trunks have been used in TDMA. The PABX as sold to a client is often not fully populated. That is to say the PABX might use a standard E1 trunk which takes 30 channels, but the customer only wants and pays for 16, so the remaining channels are unused. It is therefore possible to use a matrix to map different connections from different trunks so that a single recording channel is able to select from conversations from different trunks. The system sniffs for the relevant data.

Recently, the TDMA system has been superseded by trunking based on IP, the so-called IP trunk. IP or Internet Protocol uses data packets rather than time slots or any other form of multiplexing. What happens is that the data is digitized and placed in packets. Voice data is simply processed into the voice over IP protocol (VoIP). The packets are then provided with headers. The headers generally indicate a sequence position of the individual packet, the protocols being used, and source and destination ports of the packet.

IP trunks are regarded as more effective in terms of bandwidth efficiency and thus new PABXs are provided as IP trunks, and telephone providers (Telcos) are encouraging their subscribers to upgrade legacy systems to IP. Aside from bandwidth efficiency, the IP trunk is regarded as more effective for voice transmission since it uses the digital Voice over IP protocol. Likewise it is regarded as effective in supporting signaling of all kinds. Signaling protocols supported include Session initiation protocol (SIP) and its variation QSIP, often implemented in proprietary fashion between exchanges belonging to the same vendor.

A consequence of changing to IP trunks is however that time slots are no longer available and therefore the existing methods of monitoring that include identification of the individual connections are now rendered obsolete. The problem is exacerbated by the fact that some of the features relied upon to date to determine mapping between connections and time slots, the PABX reporting features, are not being updated by the Telcos along with the PABX itself, and so the reporting features are still based on time slots. Whilst this is insignificant in terms of most reporting needs, as the usage of the individual extensions is still correctly reported, it is problematic if using the reporting features for call monitoring, as there is no way to relate individual extensions to the ports appearing in the packet headers.

There is thus a widely recognized need for, and it would be highly advantageous to have, a third party monitoring and recording system devoid of the above limitations that is able to be effective in the IP trunk environment.

SUMMARY OF THE INVENTION

According to one aspect of the present invention there is provided a method for monitoring telephony calls on a packet switched trunk connection using packet data traffic, said trunk connecting PABX units, each trunk unit comprising a plurality of individual connections associated with individual PABX ports, said connections being grouped together using packet switching, each connection being between a data port at a first end of the trunk and another data port paired thereto at a second end of the trunk, each packet comprising a header identifying data ports of the respective connection, the method comprising:

obtaining mapping data of the connecting trunk, said mapping data relating PABX ports to individual connections; and obtaining traffic data of at least one individual connection from said trunk and providing traffic data to a monitoring system According to a second aspect of the present invention there is provided a mapping unit for monitoring telephony calls on a packet switched trunk connection using packet data traffic, said packet-switched trunk connecting PABX units, each trunk unit comprising a plurality of individual connections associated with individual PABX ports, said connections being grouped together using packet switching, each connection being between a data port at a first end of the trunk and another data port paired thereto at a second end of the trunk, each packet comprising a header identifying data ports of the respective connection, the method comprising:

a mapping unit for obtaining mapping data of the connecting trunk, said mapping data relating PABX ports to individual connections; and a connection monitoring unit for obtaining traffic data of at least one individual connection from said trunk and providing traffic data to a monitoring system.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 4 shows the monitoring device of FIG. 2 with a call detail record CDR database;

FIG. 5 shows the monitoring device of FIG. 3, with a computer telephony integration CTI database;

FIG. 9 is a simplified flow chart illustrating the procedure for monitoring a connection according to a preferred embodiment of the present invention.

DESCRIPTION OF THE PREFERRED EMBODIMENTS

Figure 1:
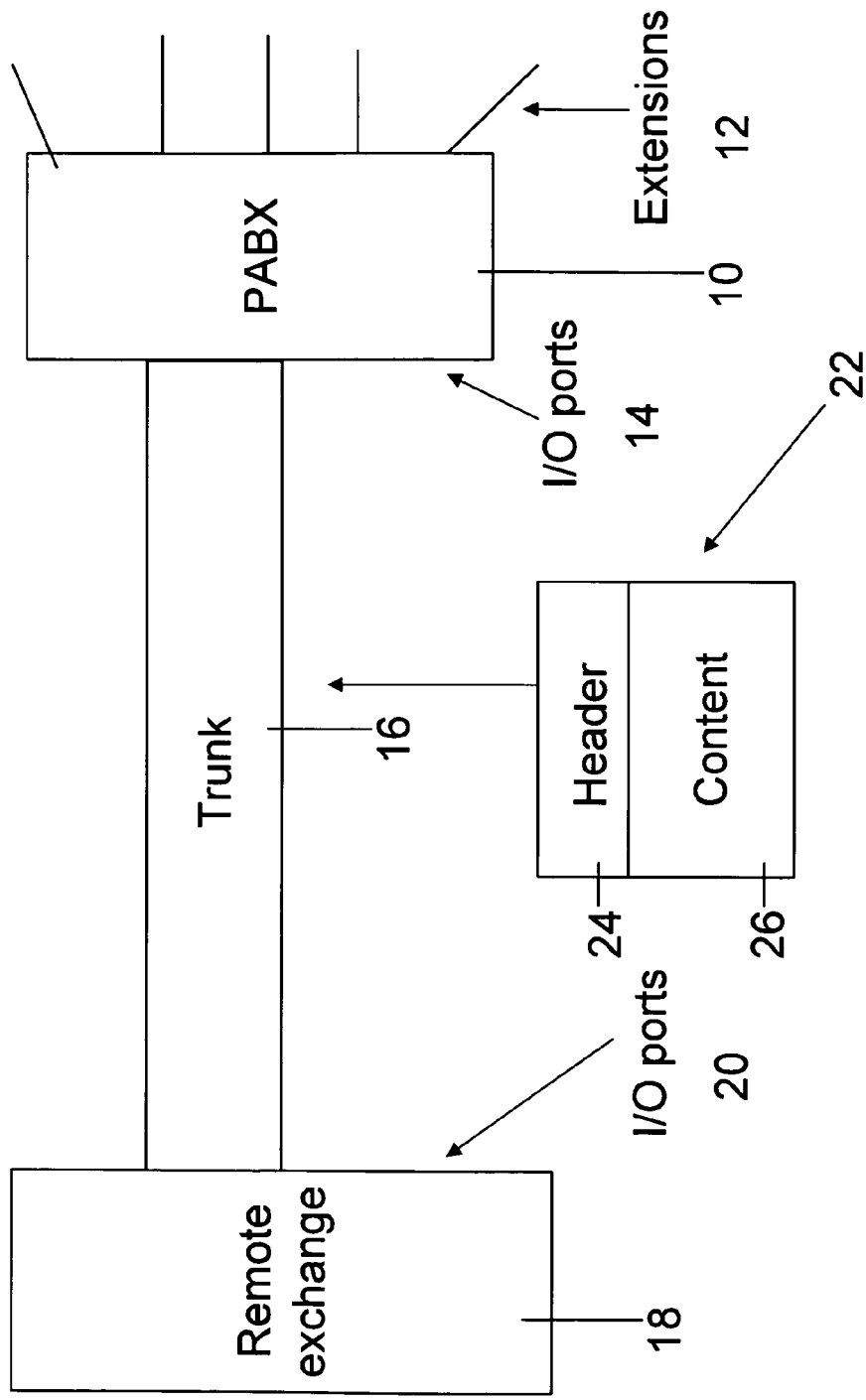
FIG. 1 is a simplified diagram showing a known connection between a PABX and a remote switch via an IP-based trunk connection.

The present embodiments comprise an apparatus, system or method that associates between the header data in packets on a telephony trunk and the physical sources and terminations of the connections, that is to say extension numbers and physical lines. The association may then be used to navigate through the trunk data to enable effective monitoring of the trunk.

The principles and operation of an associating system according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which illustrates a typical private automated branch exchange (PABX) and associated data trunk of the kind being installed by Telcos today or to which existing PABXs are being upgraded.

PABX 10 is generally located at a user's premises, say an office, and supports a number of extension lines 12, at the premises. Outwardly from the PABX are a series of input/output ports 14, each having a logical address and each able to support a single connection over trunk 16. Trunk 16 connects the PABX 10 to an external switch 18 that typically belongs to the Telco and has input/output ports 20 that are also able to support single connections over the trunk. The trunk itself is simply a multiple capacity telephone connection, able to support large numbers of individual connections. In the case of E1 switching, the trunk can support thirty separate lines at a time, or multiples thereof.

The skilled person will be aware that a data packet, such as packet 22 illustrated, is a unit of data that is sent independently over a connection or series of connections. Data packet 22 comprises a header section 24 that includes addressing information, protocol information and like data, and also a body or content section 26 that includes the information being communicated. In the case of a voice telephone conversation the data in the body is voice data, and is managed according to the dictates of the voice over IP (VoIP) protocol.

In use a connection is initiated either from within or from without the organization, but nevertheless involves one of the lines within the organization. A handshake procedure between PABX 10 and external switch 18 allows one port at the extension 18 and one port at the PABX to be designated for the call. Subsequently, data packets that belong to the connection are addressed to these data ports and thus contain the data ports in their headers. The PABX comprises internal logic that ensures that all data from packets arriving from the trunk at the designated port is directed to the corresponding extension line in the appropriate format. Typically voice data passes over the extension line as an analog signal and so the PABX is required to carry out conversion between digital and analog signals and packetization. Data intended for a computer passes over the extension line in packet form and so the task of the PABX is to add the appropriate port addresses to the headers of outgoing packets and then send them to the trunk. Incoming packets are simply sent to the extension line currently associated with the incoming port.

As explained in the background it is desired to monitor traffic on trunk 16 in accordance with the individual connections. However, the extension line information is not generally available on the trunk and therefore it is not possible to be specific about what is being monitored, or to store the monitored information in such a way as to enable useful retrieval.

Figure 2:
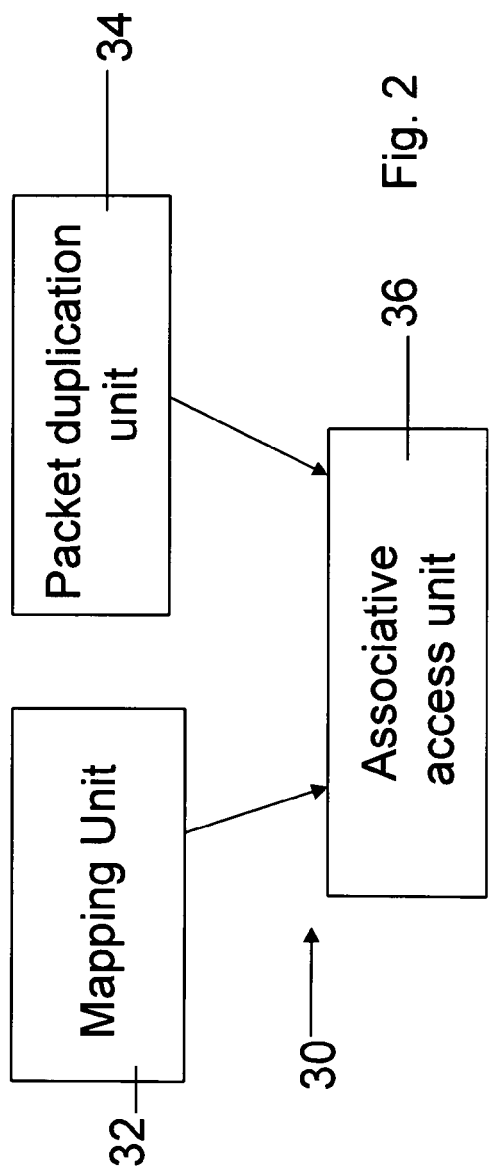
FIG. 2 is a simplified diagram showing a monitoring device for use with an IP trunk according to a first preferred embodiment of the present invention.

Reference is now made to FIG. 2, which illustrates an IP trunk monitoring device according to a first embodiment of the present invention. Monitoring device 30 comprises a mapping unit 32 which obtains mapping data of the trunk 16. The mapping data is data that relates individual ports to respective individual connections, namely the specific internal lines of the PABX.

As will be explained below, there are several possible sources for the mapping data, each having its specific advantages. One source is signaling information that is present on the trunk at the handshake stage when ports are assigned to the connection. Another source is the usage database that is invariably provided with the PABX to show line usage information to the user. As will be explained, in the default case usage data is only available after the call is completed, and furthermore the currently available usage databases map the extension lines onto the multiplexing channels of the pre-IP systems and do not include port information. The mapping unit thus requires additional logic to map between multiplexing channels and data ports.

Device 30 further comprises a packet duplication unit 34 which copies the data traffic of the trunk. As will be explained below, the unit may tap the trunk directly, or it may tap the PABX connection to the trunk. Again, in some embodiments it may copy all of the packets, allowing mapping to be carried out later. Alternatively, in a discriminative copying embodiment, it may obtain mapping information from the mapping unit and copy only those packets containing the data ports of connections it is desired to monitor.

Device 30 further comprises an associative access unit 36 which allows for access of the data monitored from the trunk according to the extension line, or any other way of defining the connection at the organization. The access unit is typically a storage device which allows the user to select an extension number and obtain the relevant traffic. Additionally or alternatively, associative access unit 36 may give real time access to passing data. Either way, monitoring is with reference to the connection itself.

Figure 3:
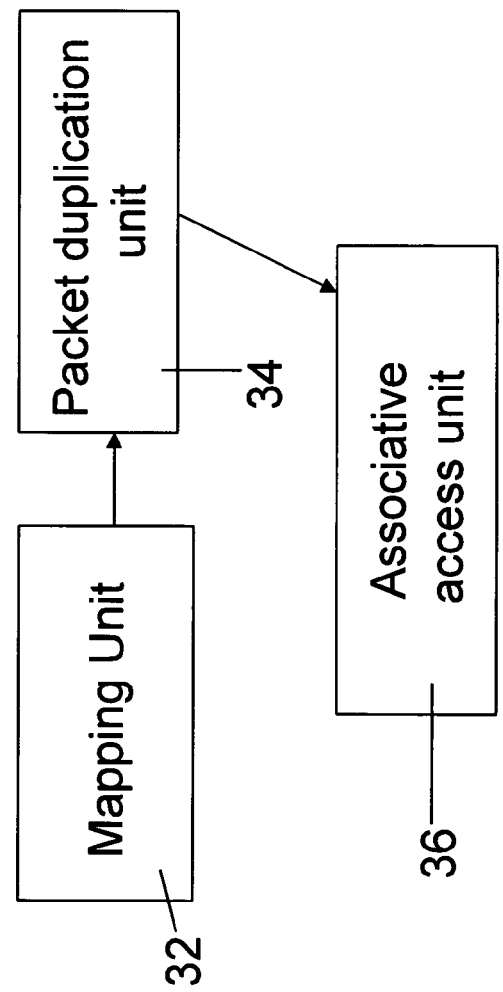
FIG. 3 is a simplified diagram showing a monitoring device for use with an IP trunk according to a second preferred embodiment of the present invention.

As shown in FIG. 2, the associative access unit 36 may obtain the extension line information direct from the mapping unit and use the mapping data to identify individual connections from the port numbers. Alternatively, in the discriminative copying embodiment, the mapping may already have been carried out. As illustrated in FIG. 3, which uses the same reference numerals as those shown in FIG. 2. the associative access unit 36 receives only the data of those connections that it has been decided in advance to monitor. The mapping data is sent directly from the mapping unit 32 to the packet duplication unit 34, allowing the duplication unit to select which packets to duplicate on the basis of respective connections, and the duplication unit 34 then sends the content data already identified to the access unit. That is to say, the packet duplication unit 34 is configured to use the mapping data to identify a pair of ports corresponding to an extension it is desired to monitor and to duplicate those packets whose headers indicate the identified pair of ports.

One of the ways in which the apparatus of FIG. 2 may work is that the packet duplication apparatus 34 in fact copies, or duplicates, the entire content of the trunk. Then mapping data is used to associate individual connections with the physical extension lines for the purposes of immediate retrieval or storage for later retrieval.

Reference is now made to FIG. 4, which is a simplified diagram illustrating a variation of the embodiment of FIG. 2. In FIG. 4, mapping data is obtained from the call detail records or CDR database 40, which is generally provided as a default service with the PABX. The CDR database stores details of telephone calls including extension details and which multiplexing channel a respective call was assigned to. However, the IP trunk does not use multiplexing channels. Rather it uses data ports. Thus, even with a CDR, it is still necessary to map between multiplexing channels and data ports.

Now there are two ways of allocating data ports, static and dynamic. In the static case, the same data port at the PABX is always used for the same extension line. In such a case a fixed extension line—data port lookup table is used. The other way is dynamic.

In the dynamic case, the data port information is preferably obtained in one of two ways. Reference is now made to FIG.

Figure 6:
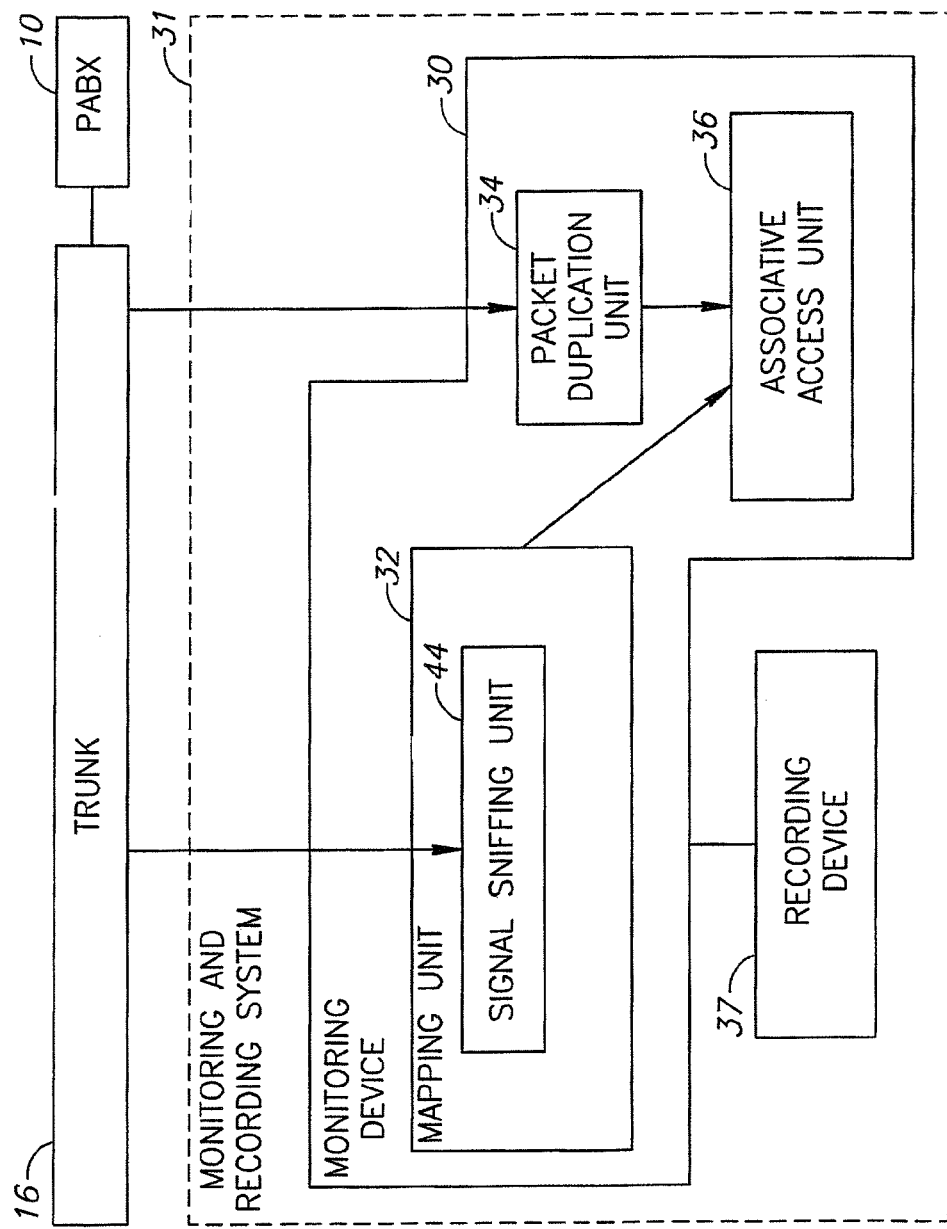
FIG. 6 is a simplified diagram showing a monitoring and recording system in which a signal sniffing device monitors call setup information on the IP trunk according to embodiments of the invention.

6, which illustrates a monitoring and recording system 31 that includes monitoring device 30 and a recording device 37. In a first embodiment, a variation of which is described below with respect to FIG. 6, signaling information is sent between the PABX 10 and the monitoring device 30. The recording device 37 can signal to the PABX 10 which extensions it wishes to monitor and then the PABX 10 may tell the monitoring device 30 which ports to monitor. Alternatively the monitoring device 30 may simply sniff the trunk 16, using a sniffing unit 44, for signaling sessions and decode the signaling sessions say to determine that a connection involving extension X was set up using port pair YZ.

In a second embodiment, which will be described in greater detail hereinbelow with respect to FIG. 7, the entire trunk, including all of the call setup signaling information, is copied to the recording device 37. In order to carry all of the information to the recording device 37, another trunk is required. This second or dedicated trunk connects between two private units, the PABX and the recording device 37, so it may be programmed to use its own protocols. It is thus possible to add extension numbers into the packet headers.

Having determined the extension numbers it is then possible to use the CDR to obtain further information, for example about the remote party, that is to say the party calling in to the organization from outside. The CDR is able to store information in association with individual telephone numbers. It is possible to use the CDR to identify particular numbers of interest and monitor the calls based on the remote party. Thus for example a particular organization may have high level, say gold, customers, and it may wish to record all conversations with gold customers to ensure that they are receiving an adequate level of service.

Reference is now made to FIG. 5, which illustrates the discriminatory duplication embodiment of FIG. 3 using computer telephony integration (CTI) database 42. The CTI database 42 is similar to the CDR except that it provides real time information about connections. Thus the CTI database may provide information about a connection as soon as the connection has been set up. The CTI 42 shares one drawback with the CDR, in that it provides information about multiplexing channels and not dataports. Thus, as with the CDR, it is preferably combined with one of the modes of obtaining port information in real time, for example sniffing and decoding of the signaling information as described above, or static mapping.

In FIG. 5, one of the ways the CTI can be used is to alert the monitoring system that a connection that it is desired to monitor has been set up. A given organization may have different requirements and policies regarding the kind of information it is felt necessary to monitor. Thus, to take a few examples, the CTI may be programmed to alert the monitoring device 30 that a connection involving a given internal extension has been set up, or it may alert the monitoring device 30 that a given external caller is currently connected, or it may alert the monitoring device that an International call has been made, or it may alert the monitoring device that a call is being made to the company legal department. In all of these cases the monitoring device is able to identify the port associated with the CTI alert and immediately start duplicating packets carrying that particular port number in the header. The monitored connection may then be accessed in real time or stored as desired.

Referring to both the embodiments of FIGS. 4 and 5, it is also possible to monitor the CDR or CTI databases to obtain the port numbers. The port numbers may be obtained from the signaling or directly from the PABX. In such a case the databases are able to provide all the mapping information.

Figure 7:
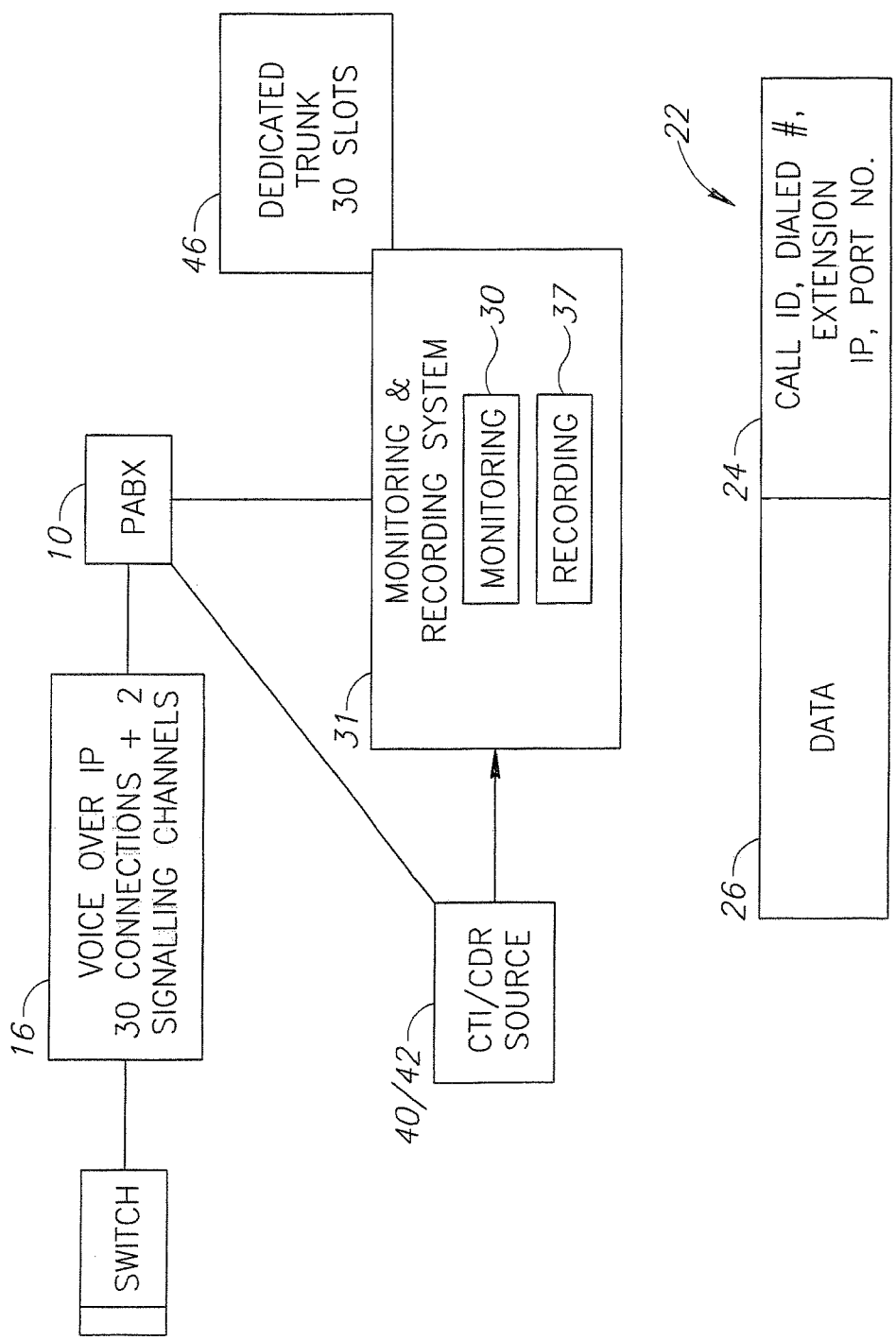
FIG. 7 is a simplified diagram in which the monitoring and recording system and a dedicated recording trunk are connected to the PABX according to embodiments of the invention.

Reference is now made to FIG. 7, which is a simplified diagram illustrating a preferred embodiment of the monitoring device in which the monitoring device 30 is directly connected to the PABX. In addition a dedicated trunk 46 carries copied data packets from the PABX to the monitoring device. Parts that are the same as in previous figures are given the same reference numerals and are not referred to again except as necessary for understanding the present embodiment. PABX 10 can be programmed to send signaling information to the monitoring device so that the monitoring device knows which data ports to monitor. Alternatively, PABX 10 can be programmed to include port information in the data packets, or even the actual extension numbers.

Figure 8:
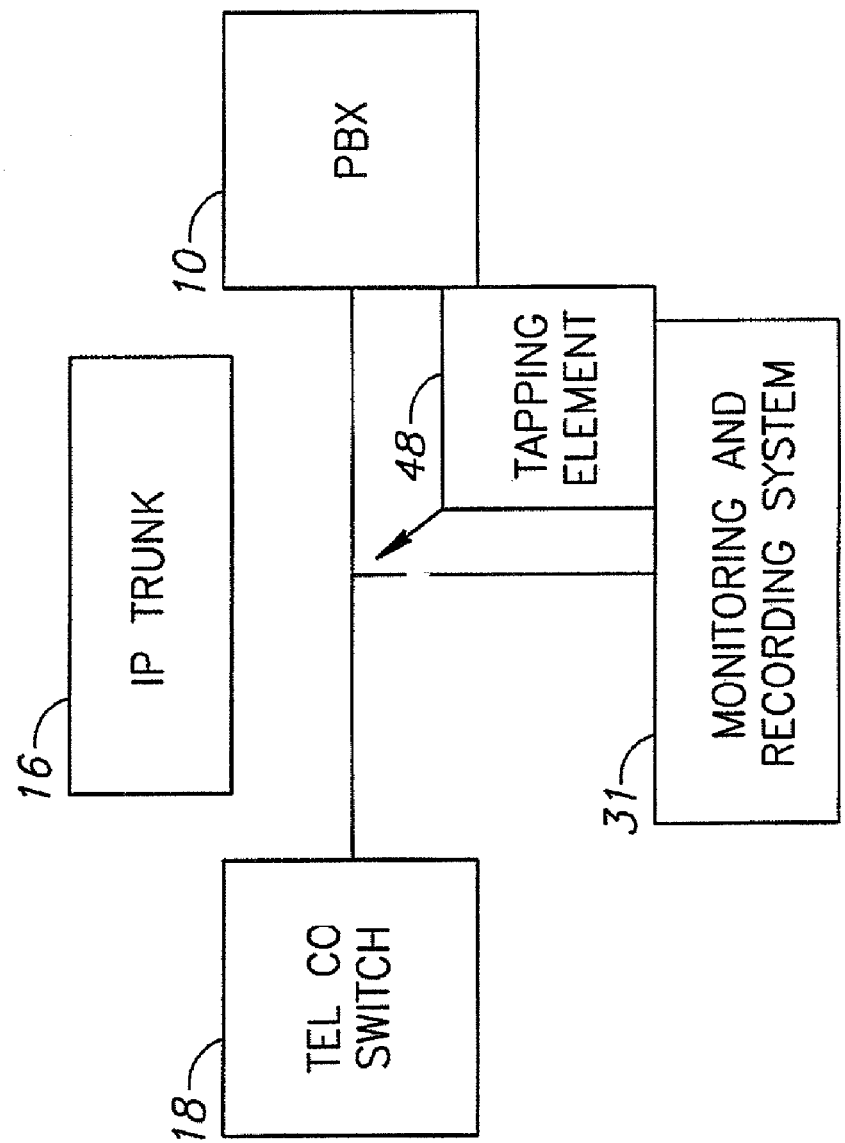
FIG. 8 is a simplified diagram illustrating a monitoring and recording system that is connected directly to the IP trunk via a tapping unit according to embodiments of the invention.

Reference is now made to FIG. 8, which is a simplified diagram illustrating an alternative embodiment in which monitoring device 30 is connected directly to IP trunk 16. Tapping element 48 duplicates packets passing over the trunk for monitoring. The tapping element may be used with any of the embodiments described above, but preferably it is used with the discriminatory embodiment so that it only copies a subset of the trunk.

Reference is now made to FIG. 9, which is a simplified flow chart illustrating a procedure for monitoring a connection via an IP trunk, according to a preferred embodiment of the present invention. A connection is requested on the trunk involving an internal extension line and an external caller. The connection is set up using a handshake process which involves assigning a data port at each end. Subsequently all packets in the connection have the data ports in their headers.

Once the call has been set up, data exchange occurs over the trunk. The monitoring system needs to map between ports and the connection details. As discussed above it may obtain this from static mapping, a particular extension always uses a given port, and therefore a static allocation table may be used. Alternatively the allocation may be dynamic, in which case the information may be obtained by decoding the signaling, or by programming the PABX to send the information to the recording device, or the entire trunk may be copied. If the entire trunk is copied using a dedicated monitoring trunk, the port-extension information may be included in the packet headers in the copy, since the dedicated trunk is entirely internal.

The monitoring system may also need to know which ports to copy. The extension numbers that need copying can be defined by programming and additionally use information available to the CDR or CTI databases. As mentioned, unless these databases are specially modified they do not include port information, so they must be combined with mapping.

The monitoring system may then make the monitored information available to the requesting user by extension number or by any other way as appropriate, so that targeted monitoring is possible.

It is expected that during the life of this patent many relevant trunking systems and recording devices and systems will be developed and the scope of the corresponding terms herein, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for voice recording and monitoring telephony calls carried on an Internet Protocol (IP) trunk coupled to a private automatic branch exchange (PABX) device, the method comprising:
   obtaining, externally to the PABX device from a computer telephony integration (CTI) link, mapping data of the IP trunk, said mapping data associating PABX ports to connections, wherein each PABX port is associated with a respective extension line of the PABX device and each connection is associated with a respective pair of IP data ports, a first IP data port at a first end of the IP trunk connected to the PABX device and a second IP data port at a second end of the IP trunk, wherein each connection carries voice data of at least one of the telephony calls;
   receiving from the CTI link a real-time indication that a selected connection to be recorded has been set up, including an identification of the first IP data port associated with the connection;
   duplicating based on the real-time indication, externally to the PABX device, packets of voice data of at least a portion of a telephone call carried by the selected connection, wherein each of the packets includes a header that identifies the first IP data port associated with the connection;
   associating, externally to the PABX device using the mapping data, between the packets of voice data associating to the connection and an extension line participating in the telephone call; and
   providing at least a portion of the packets associated with the CTI indication to a voice recording device located externally to the PABX device.

2. The method of claim 1, wherein obtaining said mapping data comprises mapping pairs of IP data ports to the PABX ports.

3. The method of claim 2, further comprising:
   obtaining information related to the data ports from headers of packets carrying the voice data over the trunk.

4. The method of claim 3, wherein obtaining the voice data comprises using said mapping data to identify a correlation between a chosen extension line and a corresponding pair of data ports and obtaining those packets whose headers indicate said corresponding pair of data ports.

5. The method of claim 1, wherein the mapping data correlating between said PABX ports and data ports coupled to the PABX is constant.

6. The method of claim 1, wherein the mapping data correlating between said PABX ports and data ports coupled to the PABX is assigned per connection.

7. The method of claim 1, wherein said mapping data is obtained when an individual telephony call is set up.

8. The method of claim 1, wherein said mapping data is obtained when an individual telephony call is concluded.

9. The method of claim 1, comprising obtaining data from PABX database.

10. The method of claim 1, comprising obtaining data from a CDR link.

11. The method of claim 1, wherein obtaining said mapping data comprises obtaining data from any combination of two or more of the following sources: the CTI link, CDR link, PABX database and setup signaling.

12. The method according to claim 1, further comprising:
    obtaining an additional mapping data relating between channels of a multiplexing system and respective extension lines.

13. The method according to claim 12, wherein obtaining the additional mapping data comprises obtaining the additional mapping data simultaneously with a connection, thereby enabling real time monitoring of specified connections.

14. The method according to claim 12, wherein obtaining the additional mapping data comprises obtaining the additional mapping data only after a connection is concluded, and wherein obtaining the voice data comprises obtaining an entire content of said trunk.

15. A monitoring and voice recording system for monitoring and recording telephony calls carried on a voice packet switched trunk coupled to a private automatic branch exchange (PABX) device, the system comprising:
    a computer telephony integration (CTI) source configured to alert that a selected connection has been set up and providing identification of an IP data port at the PABX device side that is associated with the connection;
    a mapping unit for obtaining, externally to the PABX device, from the CTI source mapping data of the trunk, said mapping data associating PABX ports to connections, wherein each PABX port is associated with a respective extension line of the PABX device and each connection is associated with a respective pair of IP data ports, a first IP data port at a first end of the trunk connected to the PABX device and second IP data port at a second end of the trunk, wherein each connection carries voice data of at least one of the telephony calls;
    a packet duplication unit for obtaining, externally to the PABX device, based on an alert received from the CTI source that the selected connection has been set up, packets of the voice data of the selected connection, wherein each of the packets includes a header that identifies the IP data port at the PABX device side associated with the connection; and
    an associative access unit for associating, externally to the PABX device using the mapping data, between the voice data associated to the connection and an extension line participating in the telephone call and for providing at least a portion of the voice data associated to the connection to a voice recording device located externally to the PABX device.

16. The system according to claim 15, wherein said packet duplication unit is configured to duplicate an entire content of said trunk.

17. The system according to claim 15, wherein said packet duplication unit is configured to use said mapping data to identify a correlation between a chosen extension line and a corresponding pair of data ports and to duplicate those packets whose headers indicate said corresponding pair of data ports.

18. The system according to claim 15, wherein said mapping unit is being configured to obtain an additional mapping data relating between channels of a multiplexing system and respective pairs of data ports based on available data correlating the channels to the extension lines.

19. The system according to claim 18, wherein the available data correlating between said channels and said extension lines is constant.

20. The system according to claim 18, wherein the available data correlating between said channels and said extension lines is assigned per connection.

21. The system according to claim 18, wherein the additional mapping data correlating between said channels and data ports coupled to the PABX is constant.

22. The system according to claim 18, wherein the additional mapping data correlating between said channels and data ports coupled to the PABX varies per connection.

23. The system according to claim 18, wherein said available data is obtainable simultaneously with a connection, thereby enabling real time monitoring of specified connections.

24. The system according to claim 18, wherein said available data is obtainable only after a connection is concluded, and wherein said packet duplication unit is configured to obtain an entire content of said trunk.

25. The system according to claim 15, wherein said mapping unit is configured to monitor said trunk to detect connection setup signaling, there from to identify a respective extension.

* * * * *